(12) United States Patent
Sakiyama et al.

(10) Patent No.: US 8,545,070 B2
(45) Date of Patent: Oct. 1, 2013

(54) DOOR MIRROR DEVICE FOR A VEHICLE

(75) Inventors: Koji Sakiyama, Sakura (JP); Mitsuru Kamikatano, Sakura (JP); Takashi Ichikawa, Sakura (JP); Bunji Inagaki, Aichi (JP); Masatsugu Ohashi, Aichi (JP); Takashi Ichikawa, Aichi (JP); Kazuya Umino, Aichi (JP)

(73) Assignees: Fujikura Ltd., Tokyo (JP); Kabushiki Kaisha Tokai Rika Denki Seisakusho, Niwa-gun, Aichi (JP)

( * ) Notice: Subject to any disclaimer, the term of this patent is extended or adjusted under 35 U.S.C. 154(b) by 365 days.

(21) Appl. No.: 12/920,743

(22) PCT Filed: Mar. 3, 2009

(86) PCT No.: PCT/JP2009/053981
§ 371 (c)(1),
(2), (4) Date: Sep. 2, 2010

(87) PCT Pub. No.: WO2009/110477
PCT Pub. Date: Sep. 11, 2009

(65) Prior Publication Data
US 2011/0013411 A1    Jan. 20, 2011

(30) Foreign Application Priority Data

Mar. 3, 2008  (JP) .................. 2008-051673

(51) Int. Cl.
F21S 8/10 (2006.01)
(52) U.S. Cl.
CPC ................... *F21S 48/1241* (2013.01)
USPC .......................... 362/494; 362/511
(58) Field of Classification Search
USPC ................. 362/494, 511, 541, 543, 501, 512, 362/540
See application file for complete search history.

(56) References Cited

U.S. PATENT DOCUMENTS

| 6,769,798 B2 | 8/2004 | Mishimagi |
| 2004/0129853 A1 | 7/2004 | Suzuki et al. |
| 2005/0243568 A1 | 11/2005 | Rodriguez Barros et al. |

FOREIGN PATENT DOCUMENTS

| JP | 4-1041 U | 1/1992 |
| JP | 05-93982 U | 12/1993 |
| JP | 2004-244004 A | 9/2004 |
| JP | 2007-250290 A | 9/2007 |
| WO | 01-28815 A2 | 4/2001 |

OTHER PUBLICATIONS

International Search Report of PCT/JP2009/053981, mailing date Jun. 2, 2009.
Supplementary European Search Report dated Jan. 30, 2012, issued in corresponding European Patent Application No. 09716478.4.
Chinese Office Action dated Apr. 1, 2012, issued in corresponding Chinese Patent Application No. 200980107527.1, with Partial translation, (8 pages).

*Primary Examiner* — Sharon Payne
(74) *Attorney, Agent, or Firm* — Westerman, Hattori, Daniels & Adrian, LLP

(57) ABSTRACT

Disclosed in a door mirror device capable of continuously emitting light from two light guides. The door mirror device comprises: a first light-emitting light guide arranged in the visor part of a door mirror foldably mounted on the door mirror support part of a vehicle; a second light-emitting light guide provided in the door mirror support part, an end of the second light-emitting light guide facing to an end of the first light-emitting light guide so as to have continuity with the first light-emitting light guide; and a light source configured to emit light toward the first light-emitting light guide and the second light-emitting light guide, the light source being provided in the visor part.

14 Claims, 7 Drawing Sheets he present invention relates to a door mirror device including a signal lamp that is incorporated in and integrated with a door mirror of an automobile and distributes light diagonally rearward of a vehicle.

BACKGROUND ART

A side turn signal lamp, which has been known as a prior art, functions as a side turn signal for a diagonal rear of a vehicle only by incident of light onto a light incident end of a light guide lens, and can distribute light with a light quantity which is appropriate to avoid too much brightness for a side of the vehicle. This side turn signal lamp includes: a curved outer lens composed so that a design surface thereof can engage with a laterally extended opening portion of a curved outer sidewall of a door mirror housing; a curved lamp body that is assembled and integrated with a rear of the outer lens, and defines a lamp chamber in cooperation with the outer lens; a synthetic resin-made curved light guide lens that is placed in the lamp chamber, is disposed laterally along the outer lens, and has a light incident end provided on a base end side thereof; and an LED as a light source arranged in a vicinity of the light incident end of the light guide lens. In the side turn signal lamp, the curved light guide lens is composed of a plurality of linear light guides. The linear light guides are substantially circular in cross section and are arrayed up and down so as to approach an inner surface of the outer lens. Each of the linear light guides has reflection steps or stipples on an entire back side thereof. The reflection steps or stipples reflect guided light forward of the light guide concerned (refer to Patent Citation 1).

Patent Citation 1: Japanese Patent Laid-Open Publication No. 2007-250290 (pp. 5 and 6, and FIG. 2)

SUMMARY OF INVENTION

Technical Problem

However, in the technique disclosed in Patent Citation 1, a space to place a light source is provided at ends of the linear light guides. Then, the light source is provided for the ends of the respective light guides facing in the same direction, and light emitted from each of the light guides does not continue with the others, whereby design of the side turn signal lamp has been poor.

In this connection, the present invention provides a door mirror device capable of allowing two light guides to emit light continuously with each other.

Solution to Problem

In order to achieve the foregoing object, the present invention provides a door mirror device comprises: a first light-emitting light guide provided in a visor part of a door mirror foldably attached to a door mirror support part of a vehicle; a second light-emitting light guide provided in the door mirror support part, an end of the second light-emitting light guide facing to an end of the first light-emitting light guide so as to have continuity with the first light-emitting light guide; and a light source configured to emit light toward the first light-emitting light guide and the second light-emitting light guide, the light source being provided in either of the visor part and the door mirror support part. The light source may includes: a first light source configured to emit light toward the first light-emitting light guide provided in the visor part; and a second light source configured to emit light toward the second light-emitting light guide through the first light-emitting light guide provided in the visor part. A first outer lens and a second outer lens may be provided, the first and second outer lenses covering the first and second light-emitting light guides, respectively, and being arranged while being provided with continuity with each other by confronting ends thereof with each other. At least a part of the first light-emitting light guide may have a curved shape. The door mirror device may further include a third light-emitting light guide arranged in the visor part so as to overlap a part of the first light-emitting light guide. The light source may have: a first light source arranged in the visor part so as to face to one end of the third light-emitting light guide; and a second light source arranged in the door mirror support part so as to face to an end of the second light-emitting light guide, the end not being confronted with the end of the first light-emitting light guide. The first light-emitting light guide may be branched, and may have at least a part formed into a curved shape, and the light source may further include: a first light source arranged in the visor part at a position where the first light source faces to one end of the first light-emitting light guide; and a second light source arranged in the door mirror support part at a position where the second light source faces to an end of the second light-emitting light guide, the end not being confronted with the end of the first light-emitting light guide.

Advantageous Effects of Invention

In accordance with the present invention, the first light-emitting light guide and the second light-emitting light guide are arranged while being provided with continuity with each other by confronting the respective ends thereof with each other. Accordingly, the light can be made incident onto both of the light-emitting light guides. As a result, the light emission can also be performed while being provided with continuity, and the design of the door mirror device is also enhanced.

DESCRIPTION OF EMBODIMENTS

First Embodiment

Figure 1:
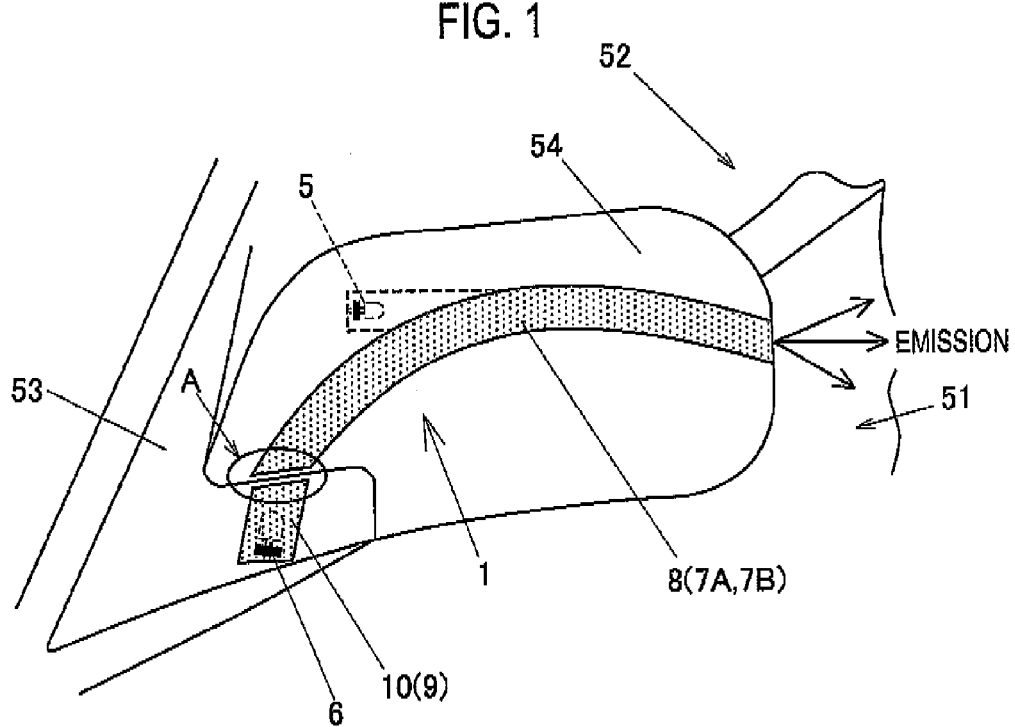
FIG. 1 is an overall view of a door mirror device according to a first embodiment and a periphery of a door mirror according thereto.
Figure 2:
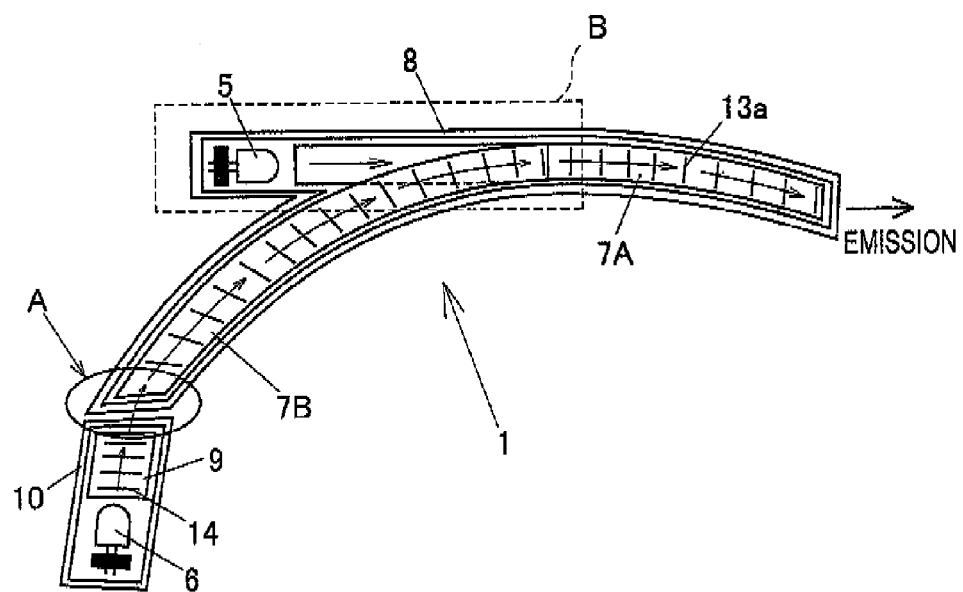
FIG. 2 is a constitutional view of the door mirror device when viewed from a back surface thereof.
Figure 3:
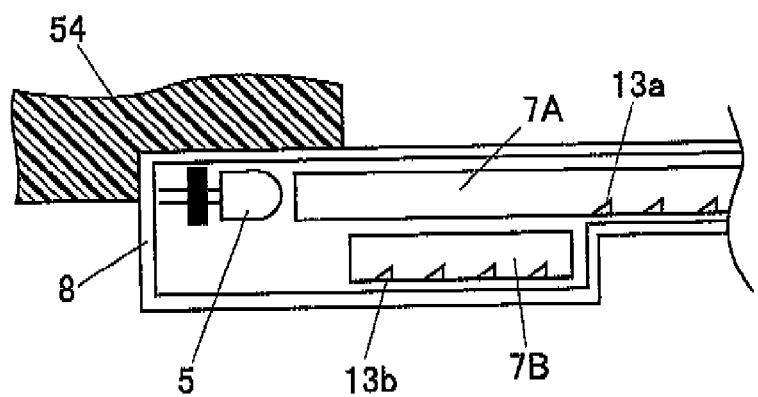
FIG. 3 is a longitudinal cross-sectional view of a dotted-line region B in FIG. 2.
Figure 4:
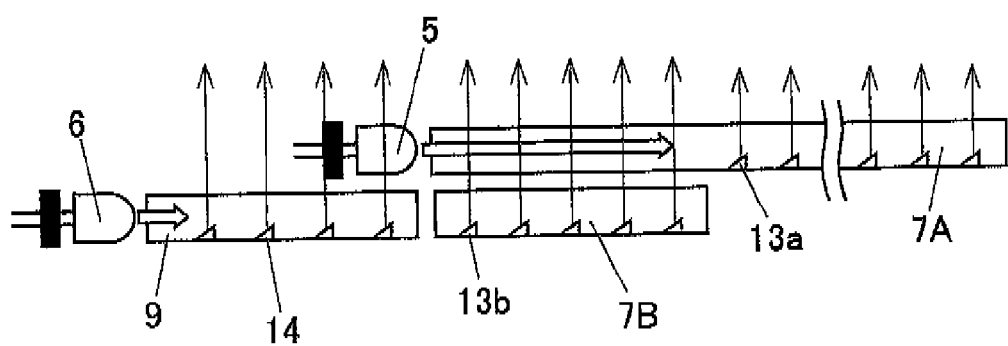
FIG. 4 is a schematic side view of three light-emitting light guides.

A description is made below of a first embodiment according to the present invention with reference to the drawings. FIG. 1 is an overall view of a door mirror device according to the first embodiment and a periphery of a door mirror according thereto. FIG. 2 is a constitutional view of the door mirror device when viewed from a back surface thereof. FIG. 3 is a longitudinal cross-sectional view of a dotted-line region B in FIG. 2. FIG. 4 is a schematic side view of three light-emitting light guides.

As illustrated in FIG. 1, a door mirror of an automobile is attached, with a foldable structure, onto a door mirror support part 53 provided on a spot of a window 52 of a door 51. The door mirror includes a visor part 54 that supports a mirror body (not shown). This visor part 54 is a housing made of synthetic resin, and an outer wall thereof is curved.

The door mirror device 1 according to the first embodiment includes: light sources 5 and 6; light-emitting light guides 7A, 7B and 9; and outer lenses 8 and 10.

The light source 5 emits light which is incident onto the light guide 7A. The light source 5 is housed in an inside of the visor part 54. A light-emitting diode (LED) and the like are applicable as the light source 5.

The light source 6 emits light which is incident onto the light guide 9 and the light guide 7B. The light source 6 is housed in an inside of the door mirror support part 53. An LED and the like are applicable as the light source 6.

The light-emitting light guide 7A guides light emitted from the light source 5, and emits the light to an outside thereof. A light source 5 side of the light-emitting light guide 7A is formed into a linear shape. A tip end side of the light-emitting light guide 7A is formed into a curved shape. A tip end of the light-emitting light guide 7A is formed extending to an outer circumference of the visor part 54. The light-emitting light guide 7A is provided in the visor part 54. The light-emitting light guide 7A is an integrally molded article composed of a transparent material capable of guiding light therethrough. As such a transparent material, there are used: a columnar object made of synthetic resin such as acrylic resin, polycarbonate resin, silicone resin and cyclopolyolefin resin; a glass rod; and the like. Among them, the acrylic columnar object is preferable in terms of transparency, processing easiness and the like. As illustrated in FIG. 3 and FIG. 4, a plurality of grooves 13a are formed on an inner wall side of the light-emitting light guide 7A.

The grooves 13a reflect the light, which is guided through the light-emitting light guide 7A, to the outside. The grooves 13a are cut so as to be perpendicular to a longitudinal direction of the light-emitting light guide 7A. The grooves 13a are formed into triangular prism shapes. On a light source 5 side of the grooves 13a, inclined surfaces for reflecting the light are formed. The plurality of grooves 13a are arranged at a predetermined interval.

The light-emitting light guide 7B guides light, which is emitted from the light source 6 and enters thereonto through the light-emitting light guide 9, and emits the light to an outside thereof. The light-emitting light guide 7B is formed into a curved shape. The light-emitting light guide 7B is provided in the visor part 54. An end (one end) of the light-emitting light guide 7B is formed extending to a vicinity of the door mirror support part 53. The one end of the light-emitting light guide 7B is arranged so as to be opposite to the light-emitting light guide 9. As illustrated in FIG. 3, an emission side end (other end) of the light-emitting light guide 7B is arranged in an inside (mirror side) of the visor part 54 so as to overlap the light-emitting light guide 7A. A plurality of grooves 13b are formed on an inner wall side of the light-emitting light guide 7B. A configuration of the grooves 13b is substantially similar to that of the grooves 13a. The light-emitting light guide 7B is an integrally molded article composed of the same material as that of the above-mentioned light-emitting light guide 7A.

The outer lens 8 protects the light source 5 and the light-emitting light guides 7A and 7B. The outer lens 8 is composed so as to cover outsides of the light source 5 and the light-emitting light guides 7A and 7B. As illustrated in FIG. 1, the outer lens 8 is fitted into a groove of the visor part 54. The outer lens 8 is an integrally molded article composed of the same material as that of the above-mentioned light-emitting light guide 7A.

The light-emitting light guide 9 guides the light emitted from the light source 6. Moreover, the light-emitting light guide 9 emits the light guided thereby to an outside thereof, and makes the light incident onto the light-emitting light guide 7B. The light-emitting light guide 9 is formed into a substantially linear shape. The light-emitting light guide 9 is provided in the door mirror support part 53. One end of the light-emitting light guide 9 faces to the light source 6 so at to continue therewith. The other end of the light-emitting light guide 9 faces to the one end of the light-emitting light guide 7B so as to have continuity therewith (refer to a region A indicated by an arrow in FIG. 1). A plurality of grooves 14 are formed on an inner wall side of the light-emitting light guide 9. The light-emitting light guide 9 is an integrally molded article composed of the same material as that of the above-mentioned light-emitting light guide 7A.

The outer lens 10 protects the light source 6 and the light-emitting light guide 9. The outer lens 10 is composed so as to cover outsides of the light source 6 and the light-emitting light guide 9. The outer lens 10 is an integrally molded article composed of the same material as that of the above-mentioned light-emitting light guide 7A.

Next, a description is made of operations of the door mirror device 1 according to the above-mentioned first embodiment.

First, when a user switches on the light sources 5 and 6, light is emitted from the light sources 5 and 6.

The light emitted from the light source 5 enters onto the light-emitting light guide 7A, and is guided therethrough. Then, the light thus guided is reflected on the grooves 13a and is emitted to the outside. Moreover, a part of the light is emitted from the other end of the light-emitting light guide 7A. The light emitted from the other end of the light-emitting light guide 7A illuminates a diagonal rear of the vehicle, and thus functions as a directional indicator.

Meanwhile, the light emitted from the light source 6 enters onto the light-emitting light guide 9 from the one end thereof, and is guided through the light-emitting light guide 9. The light thus guided is reflected on the grooves 14 and is emitted to the outside. Moreover, a part of the light is emitted from the other end of the light-emitting light guide 9, and enters onto the one end of the light-emitting light guide 7B. The light incident onto the light-emitting light guide 7B is guided through the inside of the light-emitting light guide 7B along a curve thereof while being reflected on the inner wall thereof. The light guided through the light-emitting light guide 7B is reflected on the grooves 13b and is emitted to the outside.

As mentioned above, in the door mirror device 1 according to the first embodiment, the light-emitting light guide 9 and the light-emitting light guide 7B are arranged so as to continue with each other. In such a way, the light guided through the light-emitting light guide 9 is emitted from the light-emitting light guide 9, thereafter enters onto the light-emitting light guide 7B. Therefore, it is possible to irradiate light continuously from the door mirror support part 53 to a tip end of the visor part 54 as a design.

Moreover, in the door mirror device 1, the light source 5 enters light emitted therefrom onto the light-emitting light guide 7A. Therefore, even when the light-emitting light guide 7B has a large curvature, an irradiation amount of the light from the light-emitting light guide 7A is enhanced, whereby uniformity of the light in the whole of the light-emitting light guides 7A, 7B and 9 can be enhanced.

Second Embodiment

Figure 5:
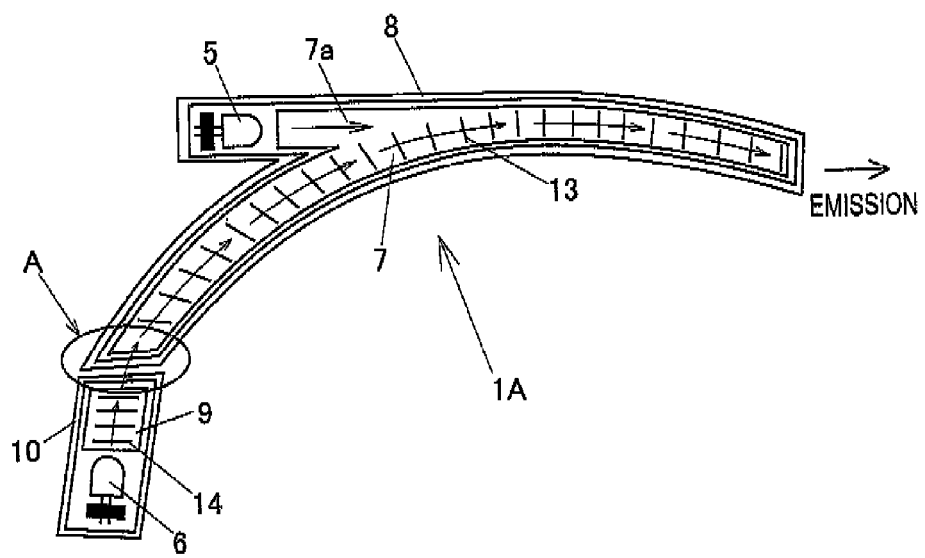
FIG. 5 is an equivalent view to FIG. 2, illustrating a door mirror device according to a second embodiment.

Next, a description is made about a door mirror device 1A according to a second embodiment, with reference to the drawing. The door mirror device 1A is partially modified from the above-mentioned first embodiment. FIG. 5 is an equivalent view to FIG. 2, illustrating the door mirror device according to the second embodiment. Note that the same reference numerals are assigned to similar constituents to those of the above-mentioned embodiment, and a description thereof is omitted.

In the door mirror device 1A illustrated in FIG. 5, the above-mentioned light-emitting light guides 7A and 7B, which are illustrated in FIG. 2, are integrated with each other. Specifically, the door mirror device illustrated in FIG. 5 includes two light-emitting light guides 7 and 9.

The light-emitting light guide 7 of the door mirror device 1A illustrated in FIG. 5 includes a branch part 7a branched therefrom. The light-emitting light guide 7 is formed into a curved shape. One end of the light-emitting light guide 7 is arranged in a vicinity (region A) of a gap between the visor part 54 and the door mirror support part 53. The light source 5 is arranged at a position where it faces to the branch part 7a of the light-emitting light guide 7.

One end of the light-emitting light guide 9 is confronted with one end of a curve portion of the light-emitting light guide 7. The light source 6 is arranged at a position where it faces to the other end of the light-emitting light guide 9, which is not confronted with the end of the curve portion of the light-emitting light guide 7.

As mentioned above, in the mirror device 1A illustrated in FIG. 5, these two light-emitting light guides 7 and 9 are employed. Accordingly, the number of parts can be reduced.

Third Embodiment

Figure 6:
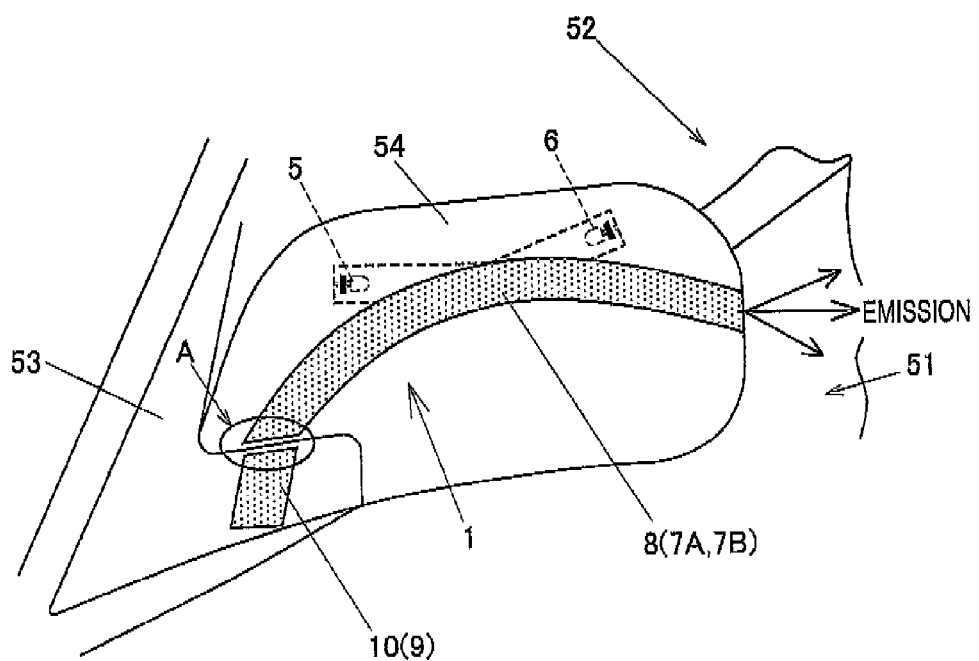
FIG. 6 is an overall view of a door mirror device according to a third embodiment and a periphery of a door mirror according thereto.
Figure 7:
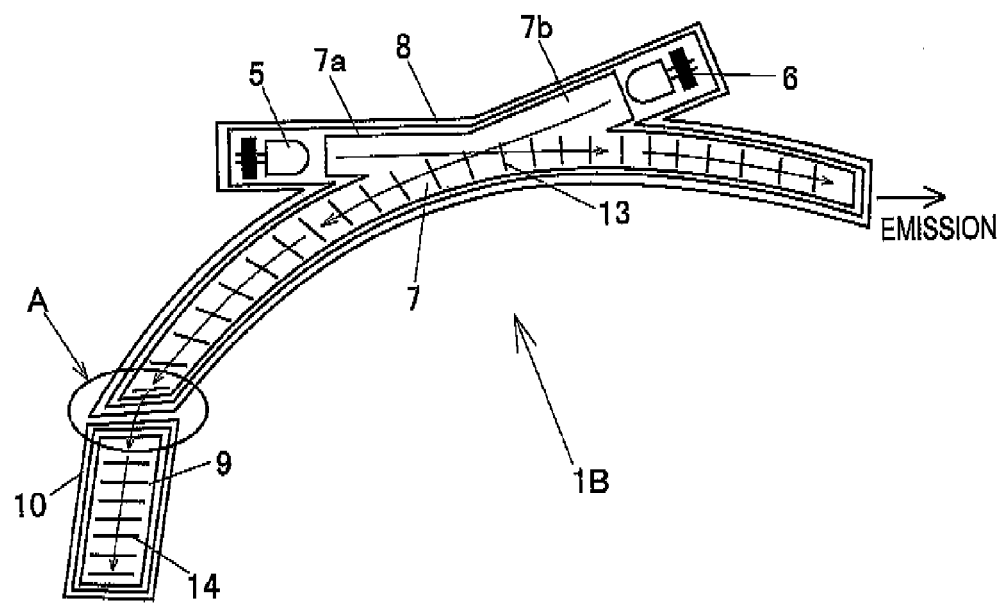
FIG. 7 is an equivalent view to FIG. 2, illustrating the door mirror device according to the third embodiment.

Next, a description is made about a door mirror device 1B according to a third embodiment with reference to the drawings. The door mirror device 1B is partially modified from the above-mentioned embodiments. FIG. 6 is an overall view of the door mirror device according to the third embodiment and a periphery of a door mirror according thereto. FIG. 7 is an equivalent view to FIG. 2, illustrating the door mirror device according to the third embodiment. Note that the same reference numerals are assigned to similar constituents to those of the above-mentioned embodiments, and a description thereof is omitted.

A light-emitting light guide 7 of the door mirror device 1B illustrated in FIG. 6 and FIG. 7 is branched at two spots, and includes two branch parts 7a and 7b. The light source 6 is provided in an end of the branch part 7b. Specifically, in the door mirror device 1B, the light source 6 is also arranged in the visor part 54.

In the door mirror device 1B of the third embodiment, when light is emitted from the light source 6, the light thus emitted is guided through the light-emitting light guide 7. A part of the light thus guided is reflected on grooves 13 and is emitted to the outside. The rest of the light is emitted from an end of the light-emitting light guide 7, and thereafter, enters onto the light-emitting light guide 9. Then, while being guided through the inside of the light-emitting light guide 9, the light incident onto the light-emitting light guide 9 is reflected on the grooves 14 and is emitted to the outside. Specifically, in the door mirror device 1B, the light emitted from the light source 6 is guided in a direction reverse to light emitted from the light source 5.

As mentioned above, in the door mirror device 1B according to the third embodiment, both of the light source 5 and the light source 6 are arranged in the visor part 54 having a large volume. In such a way, electric wires for both of the light source 5 and the light source 6 can be provided in the visor part 54. As a result, layout of the electric wires is simplified, whereby the number of parts such as wiring members can be reduced.

Modified Embodiments

A description is made about modified embodiments that are partially modified from the above-mentioned embodiments with reference to the drawings.

Figure 8:
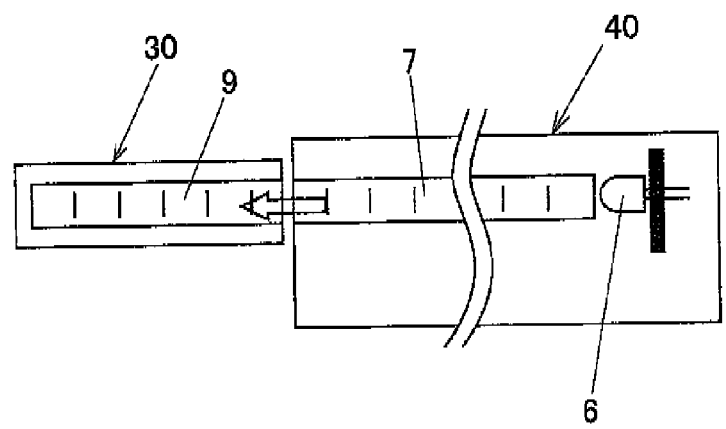
FIG. 8 is a front view illustrating a state where light-emitting light guides are attached to two large and small members.

A door mirror device illustrated in FIG. 8 is composed so that, even when one of parts 30 and 40, in which the light-emitting light guides 9 and 7 are arranged respectively, is too small to have a mounting space for the light source, emission of light can be made by incidence of light onto the light-emitting light guide 9 from the light-emitting light guide 7 (part 40 side) as being the other of the parts 30 and 40.

Figure 9:
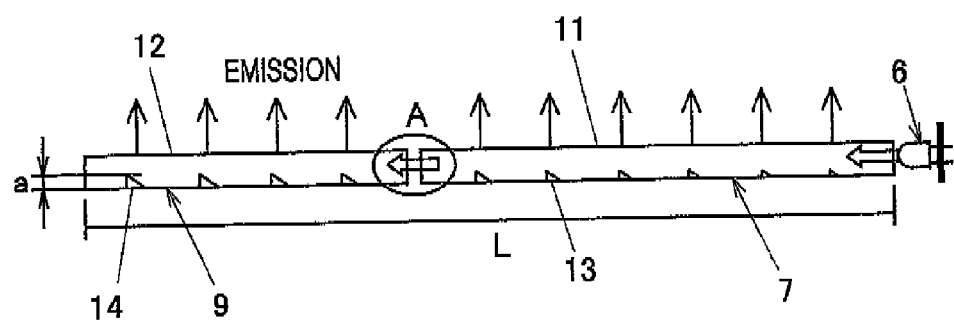
FIG. 9 is a side view illustrating grooves formed on two light-emitting light guides.
Figure 10:
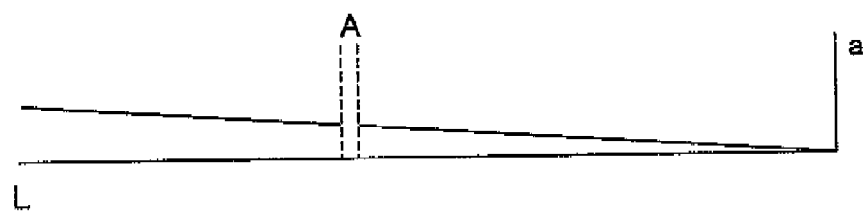
FIG. 10 is a graph illustrating a depth of each of the grooves in FIG. 9.

In a door mirror device illustrated in FIG. 9 and FIG. 10, on side surfaces of the light-emitting light guides 7 and 9, which are opposite with light-emitting surfaces 11 and 12, the grooves 13 and 14 are formed. These grooves 13 and 14 are cut in the direction perpendicular to the longitudinal direction of the light-emitting light guides 7 and 9, and a depth a of the grooves 13 and 14 is increased as going in a direction going away from the light source 6. The depth a of the grooves 13 and 14 has a relationship as illustrated by a graph in FIG. 10 with respect to a total length L of the two light-emitting light guides 7 and 9. In this embodiment, with regard to a change of the depth a between the grooves 13 and 14, the depth a is increased smoothly and gradually from the light incident side toward the light emission side.

Figure 11:
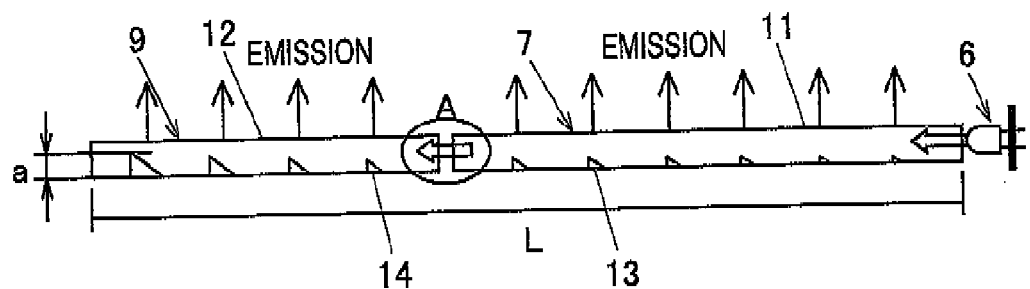
FIG. 11 is a side view illustrating another modified embodiment of the grooves.
Figure 12:
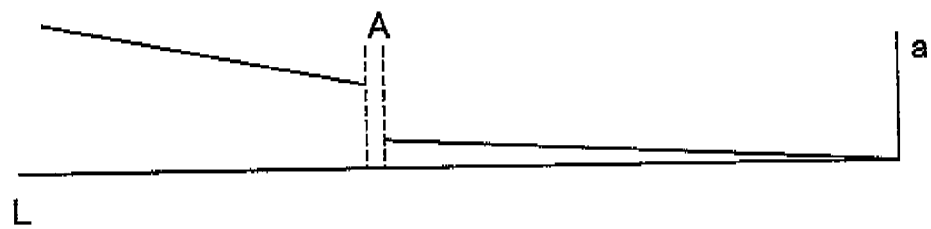
FIG. 12 is a graph illustrating a depth of each of the grooves in FIG. 11.

In another door mirror device illustrated in FIG. 11 and FIG. 12, a setting is made so as to increase a difference between the depth a of one of the grooves 13 in the light-emitting light guide 7, which is the most distant from the light source 6, and the depth a of one of the grooves 14 in the light-emitting light guide 9, which is located on a left end of FIG. 11. The light is emitted once from the light-emitting light guide 7, the light thus emitted enters onto the light-emitting light guide 9, and accordingly attenuation of the light at this time is increased. However, in this embodiment, a decrease of the light emission from the light-emitting light guide 9 due to the attenuation can be reduced since the depth of the grooves 14 is deeper than that in the modified embodiment in FIG. 9. The grooves 14 are deepened after a region A in FIG. 11 and FIG. 12 in consideration of such light attenuation in the region A concerned, whereby the light-emitting light guides 7 and 9 can be allowed to emit the light uniformly. In this modified embodiment, a difference in depth a between the last groove 13 (on the left end of the light-emitting light guide 7 in FIG. 11) through which the light passes and the first groove 14 (on the right end of the light-emitting light guide 9 in FIG. 11) through which the light passes is set at 1.7 to 2.4 times.

Figure 16:
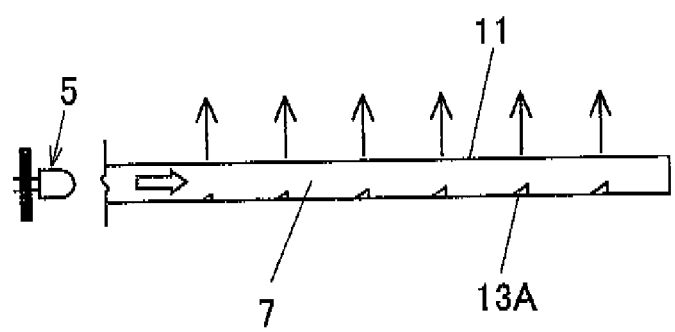
FIG. 16 is a view illustrating grooves formed on a light-emitting light guide onto which light from a light source becomes incident.

Note that the grooves 13 and 14 correspond to the reflection steps described in Patent Citation 1. However, in the embodiment shown in FIGS. 6 and 7 for example, the light enters from the light sources 5 and 6 onto the light-emitting light guide 7 in which the grooves 13 are formed, and a traveling direction of the incident light from the light source 6 and a traveling direction of the incident light from the light source 5 are opposite to each other. Accordingly, the grooves 13 are formed as those having reflection surfaces for the incident light from the light source 6, and grooves 13A as illustrated in FIG. 16 are formed as those having reflection surfaces for the incident light from the light source 5.

Figure 13:
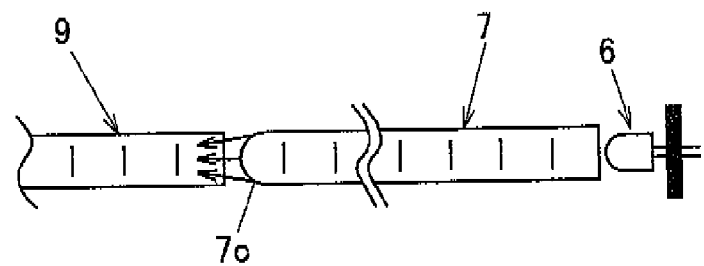
FIG. 13 is a side view illustrating an example where a tip end of an emission portion is formed into a projection shape.

A door mirror device illustrated in FIG. 13 is composed so that an end 7c of the light-emitting light guide 7 facing to the end of the light-emitting light guide 9 can be formed into a projection shape to converge the light emitted therefrom. In this configuration, light leakage can be reduced, and incident efficiency of the light onto the light-emitting light guide 9 can be enhanced.

In the modified embodiments in FIG. 10 and FIG. 12, both of the grooves 13 of the light-emitting light guide 7 and the grooves 14 of the light-emitting light guide 9 are formed so that the depths thereof can be increased as going away from the light source. However, if the depth of the groove 14 close to the incident end of the light-emitting light guide 9 is larger than the depth of the groove 13 close to the emission end of the light-emitting light guide 7, then necessary and sufficient light transfer from the light-emitting light guide 7 to the light-emitting light guide 9 is obtained. Under such a condition, the depth of the grooves 13 may be constant, the depth of the grooves 14 may be constant, and further, the depths of both of the grooves 13 and 14 may be constant.

Figure 14:
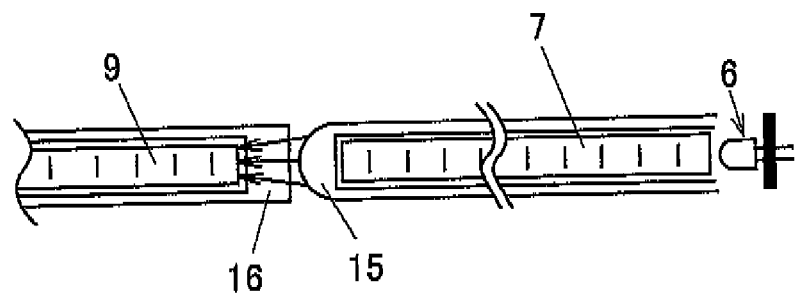
FIG. 14 is a side view illustrating an example of using a lens.

In a modified embodiment illustrated in FIG. 14, a lens 15 having a light converging function is provided an the light emission end of the light-emitting light guide 7, and a lens 16 having a light receiving function is also provided on the light receiving end of the light-emitting light guide 9, whereby the light leakage is reduced to the minimum.

Figure 15:
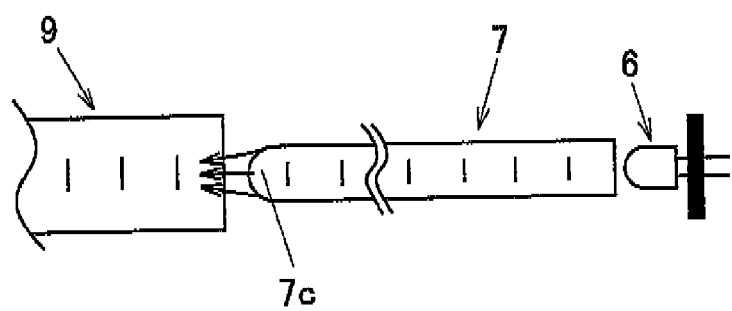
FIG. 15 is a front view illustrating an example where an incident end of one of the light-emitting light guides is made larger than an emission end of the other light-emitting light guide.

In a modified embodiment illustrated in FIG. 15, the light-emitting light guide 9 is increased in size to expand the incident surface of the light, whereby the light leakage is further reduced. The emission end 7c of the light-emitting light guide 7 is formed into a projection shape; however, may be formed into the same shape as that in FIG. 8, and the lens 15 may be provided thereon. In this example, a cross-sectional area of the incident end of the light-emitting light guide 9 is increased by approximately 1.5 times than a cross-sectional area of the light-emitting light guide 7.

FIG. 16 illustrates the shape of the grooves 13A for reflecting the light, which comes from the light source 5, toward the light emission surface 11. The grooves 13A are formed into a reverse shape to that of the grooves 13.

The outer lenses 8 and 10 achieve scratch prevention for the light-emitting light guides 7, 7A, 7B and 9; however, a configuration can also be adopted so as not to use the outer lenses 8 and 10 by implementing hard coating treatment for the surfaces of the light-emitting light guides 7, 7A, 7B and 9.

The description has been made above of the present invention in detail by using the embodiments; however, the present invention is not limited to the embodiments described in this specification. The scope of the present invention is determined by the scope of claims and by an equilibrium scope to the description of the scope of claims.

REFERENCE SIGNS LIST 1, 1A and 1B: door mirror device
5 and 6: light source
7A, 7B, 7 and 9: light-emitting light guide
8 and 10: outer lens
13, 13a, 13b and 14: groove
51: door
52: window
53: door mirror support part
54: visor part

The invention claimed is:
1. A door mirror device for a vehicle comprising:
a door mirror support part;
a visor part foldably attached to the support part, the visor part being foldable with respect to the support part;
a first light-emitting light guide body guiding light therethrough and emitting a part of the light from a side surface thereof, the first light-emitting guide body being provided in the visor part;
a second light-emitting light guide body guiding light therethrough and emitting a part of the light from a side surface thereof, the second light-emitting guide body being provided in the support part such that the first light-emitting light guide body is foldable with respect to the second light-emitting light guide body, and such that an end surface of the second light-emitting light guide body faces to an end surface of the first light-emitting light guide body so as to have the light emitted from one of the first light-emitting guide body and the second light-emitting guide body enter the other of the first light-emitting guide body and the second light-emitting guide body; and
a light source configured to emit light toward the first light-emitting light guide body and the second light-emitting light guide body, the light source being provided in either of the visor part and the door mirror support part.

2. The door mirror device according to claim 1, wherein the light source includes: a first light source configured to emit light toward the first light-emitting light guide body provided in the visor part; and a second light source configured to emit light toward the second light-emitting light guide body through the first light-emitting light guide body provided in the visor part.

3. The door mirror device according to claim 1, further comprising:
a first outer lens and a second outer lens, the first and second outer lenses covering the first light-emitting light guide body and the second light-emitting light guide body, respectively, and being arranged such that an end of the first outer lens faces to an end of the second outer lens.

4. The door mirror device according to claim 1, further comprising
a third light-emitting light guide body guiding light therethrough and emitting a part of the light from a side surface thereof, the third light-emitting light guide body being arranged in the visor part so as to overlap with a part of the first light-emitting light guide body,
wherein the light source includes:
a first light source arranged in the visor part so as to face to one end of the third light-emitting light guide body; and
a second light source arranged in the door mirror support part so as to face to an end of the second light-emitting light guide body, the end not being confronted with the end of the first light-emitting light guide body.

5. The door mirror device according to claim 1,
wherein the first light-emitting light guide body is branched to have a branch protion, and
the light source includes:
a first light source arranged in the visor part so as to face to one end of the first light-emitting light guide body; and
a second light source arranged in the support part so as to face to an end of the second light-emitting light guide body, the end not being confronted with the end of the first light-emitting light guide body.

6. The door mirror device according to claim 2, wherein the first light-emitting light guide body has one end to emit the light from the first light source toward a diagonal rear of the vehicle.

7. The door mirror device according to claim 4, wherein the third light-emitting light guide body has the other end to emit the light from the first light source toward a diagonal rear of the vehicle.

8. The door mirror device according to claim 1, wherein the first light-emitting light guide body and the second light-emitting light guide body are provided with a plurality of grooves to reflect the part of light therethrough toward the side surfaces thereof.

9. The door mirror device according to claim 8, wherein depths of the grooves changes such that light emissions from the side surfaces of the first light-emitting light guide body and the second light-emitting light guide body become uniform.

10. The door mirror device according to claim 4, wherein the first light-emitting light guide body, the second light-emitting light guide body, and the third light-emitting light guide body are provided with a plurality of grooves to reflect the part of light therethrough toward the side surfaces thereof.

11. The door mirror device according to claim 10, wherein depths of the grooves changes such that light emissions from the side surfaces of the first light-emitting light guide body, the second light-emitting light guide body, and the third light-emitting light guide body become uniform.

12. The door mirror device according to claim 4, wherein at least a part of the first light-emitting light guide body has a curved shape.

13. The door mirror device according to claim 4, wherein at least a part of the third light-emitting light guide body has a curved shape.

14. The door mirror device according to claim 5, wherein at least a part of the first light-emitting light guide body has a curved shape.

* * * * *